US012651251B2

(12) United States Patent
Bautista Chia et al.

(10) Patent No.: US 12,651,251 B2
(45) Date of Patent: Jun. 9, 2026

(54) SYSTEMS AND METHODS FOR BLOCKCHAIN-BASED SECURE MULTIPARTY COMPUTATION

(71) Applicants: The Florida International University Board of Trustees, Miami, FL (US); The United States of America as represented by the Secretary of the Air Force, Rome, NY (US)

(72) Inventors: Oscar G. Bautista Chia, Miami, FL (US); Richard Hernandez Garcia, Miami, FL (US); Kemal Akkaya, Miami, FL (US); Selcuk Uluagac, Miami, FL (US); Soamar Homsi, Rome, NY (US); Mohammad Hossein Manshaei, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 102 days.

(21) Appl. No.: 18/674,303

(22) Filed: May 24, 2024

(65) Prior Publication Data

US 2025/0363486 A1 Nov. 27, 2025

(51) Int. Cl.
*G06Q 20/38* (2012.01)
*G06Q 20/02* (2012.01)

(52) U.S. Cl.
CPC ......... *G06Q 20/3823* (2013.01); *G06Q 20/02* (2013.01); *G06Q 20/3829* (2013.01); *H04L 2209/46* (2013.01)

(58) Field of Classification Search
CPC .............. G06Q 20/3823; G06Q 20/02; G06Q 20/3829; H04L 2209/46
See application file for complete search history.

(56) References Cited

U.S. PATENT DOCUMENTS

| | | | |
|---|---|---|---|
| 2019/0147438 A1* | 5/2019 | Micali | G06Q 20/4016 705/71 |
| 2019/0205881 A1* | 7/2019 | Borzilleri | G06Q 30/018 |
| 2019/0215159 A1* | 7/2019 | Notani | H04L 9/3297 |
| 2020/0050595 A1* | 2/2020 | Sun | G06F 16/2379 |
| 2020/0396059 A1* | 12/2020 | Micali | H04L 63/123 |
| 2023/0367898 A1* | 11/2023 | Hanson, Jr. | G06F 16/2365 |

OTHER PUBLICATIONS

Chen, Jing et al. "Algorand Agreement: Super Fast and Partition Resilient Byzantine Agreement." Cryptology ePrint Archive, Apr. 25, 2018.
Gilad, Yossi et al. "Algorand: Scaling Byzantine Agreements for Cryptocurrencies." Proceedings of the 26th symposium on operating systems and principles, pp. 51-68, (Year: 2017).

* cited by examiner

*Primary Examiner* — Vance M Little
(74) *Attorney, Agent, or Firm* — SALIWANCHIK, LLOYD & EISENSCHENK

(57) ABSTRACT

Systems and methods for secure multiparty computation (MPC) over blockchain that packs messages into blockchain transactions are provided. MPC can be over Algorand blockchain that packs messages into Algorand transactions and utilizes its fast gossip protocol to transmit them efficiently among MPC parties (e.g., MPC nodes). The messages can be appended to a note field in the respective Algorand transactions.

16 Claims, 11 Drawing Sheets

R: Algorand Relay node
P: MPC/Algorand node

R: Algorand Relay node
P: MPC/Algorand node

| ID | CSP | Region | Location |
|----|-----|--------|----------|
| 1 | GCP | central1 | Iowa |
| 2 | AWS | west2 | Oregon |
| 3 | GCP | east4 | N.Virginia |
| 4 | AWS | west1 | N.California |
| 5 | GCP | east1 | S.Carolina |
| 6 | AWS | east2 | Ohio |
| 7 | GCP | west3 | Utah |

FIG. 8

| Number | CSP | Region | Location |
|---|---|---|---|
| 1 | AWS | east2 | Ohio |
| 2 | AWS | west1 | N.California |
| 3 | AWS | west2 | Oregon |
| 4 | GCP | central1 | Iowa |

FIG. 9

SYSTEMS AND METHODS FOR BLOCKCHAIN-BASED SECURE MULTIPARTY COMPUTATION

GOVERNMENT SUPPORT

This invention was made with government support under FA8750-21-2-0505 awarded by the Air Force Research Laboratory. The government has certain rights in the invention.

BACKGROUND

In Secure Multiparty Computation (MPC), two or more parties jointly compute a function on private inputs without knowing any information other than the function's output. During the last decade, MPC has advanced from a theoretical technique to an effective and practical solution in many real-life applications where assuring user privacy is a priority, such as in the health care and finance sectors. However, MPC is still several orders of magnitude slower than computing directly on data in the clear because MPC parties are typically connected by direct peer-to-peer connections among parties, which increases the computation time as parties need to wait for messages from each other, thus making network communication a bottleneck.

BRIEF SUMMARY

Embodiments of the subject invention provide novel and advantageous systems and methods for multiparty computation (MPC) over blockchain protocol that packs messages into blockchain transactions. For example, MPC can be over Algorand protocol that packs messages into Algorand transactions and utilizes its fast gossip protocol to transmit them efficiently among MPC parties (e.g., MPC nodes). Systems and methods using this approach therefore avoid the complexity and delay associated with fully connected peer-to-peer (P2P) networks while assuring the integrity of the broadcasted data. As a result, this approach effectively reduces the message delivery delay, and hence the total MPC execution time.

In an embodiment, a system for secure MPC can comprise: a processor; and a (non-transitory) machine-readable medium (e.g., a (non-transitory) computer-readable medium) in operable communication with the processor and having instructions stored thereon that, when executed by the processor, perform the following steps: receiving data respectively from a plurality of MPC nodes; processing the data received from the MPC nodes into processed data; packing the processed data into at least one Algorand blockchain transactions; and utilizing an Algorand protocol to transmit the blockchain transactions to the plurality of MPC nodes. For example, the instructions when executed by the processor can perform the following steps: receiving first data from a first MPC node and second data from a second MPC node (and optionally third data from a third MPC node, etc. up to any number of MPC nodes); processing the first data and the second data (and the third data, etc.) into processed data; packing the processed data into at least one Algorand blockchain transaction comprising a first Algorand blockchain transaction (and optionally a second Algorand blockchain transaction, optionally a third Algorand blockchain transaction, etc.); and utilizing an Algorand protocol to transmit the at least one Algorand blockchain transaction to the second MPC node and the first MPC node (and the third MPC node, etc.). Any or all of the Algorand blockchain transactions of the at least one Algorand blockchain transaction can be an Algorand payment transaction. The Algorand protocol utilized for transmitting the at least one Algorand blockchain transaction can be, for example, a fast gossip protocol. The instructions when executed (e.g., by a relay node) can further perform the following step: recording the at least one Algorand blockchain transaction in an Algorand blockchain ledger (e.g., recording the first Algorand blockchain transaction in the Algorand blockchain ledger and recording the second Algorand blockchain transaction in the Algorand blockchain ledger). The transmitting of the at least one Algorand blockchain transaction can be done securely using Algorand secure broadcast channels. The instructions when executed by the processor can further perform the following steps: assigning a first peer (e.g., MPC node, such as the first MPC node (or in some cases a user of the system)) a first Algorand account comprising a first public key and a first private key; and assigning a second peer (e.g., MPC node, such as the second MPC node (or in some cases another user of the system)) a second Algorand account comprising a second public key and a second private key. The first peer can be aware of the second public key, and the second peer can be aware of the first public key. This can be extended to any number of peers, each aware of the public keys of any or all of the other peers. The Algorand protocol can be run on an Algorand network (e.g., a private Algorand network). The Algorand network (e.g., private Algorand network) can comprise a plurality of MPC nodes (e.g., comprising the first MPC node and the second MPC node, etc.) and a plurality of relay nodes. Each MPC node of the plurality of MPC nodes can connect to at least one relay node of the plurality of relay nodes, and the MPC nodes can be offline nodes that do not participate in the Algorand protocol (and/or in an Algorand consensus protocol, which may be different from the Algorand protocol utilized for transmitting the blockchain transactions) but do send and receive transactions (e.g., Algorand blockchain transactions). The packing of the processed data into the at least one Algorand blockchain transaction can comprise appending the processed data into a respective note field of each Algorand blockchain transaction of the at least one Algorand blockchain transaction (e.g., the packing of the processed data into the first Algorand blockchain transaction can comprise appending the processed data to a note field of the first Algorand blockchain transaction, and/or the packing of the processed data into the second Algorand blockchain transaction can comprise appending the processed data to a note field of the second Algorand blockchain transaction). The respective note field of each Algorand blockchain transaction can have a size capacity of at least 1 kilobyte (kb) (e.g., in a range of from 1 kb to 16 kb, or at least 16 kb). Though the example with a first MPC node and a second MPC node has been described extensively, this is for exemplary purposes, and the same features can be extended to any reasonable number of MPC nodes.

In another embodiment, a method for secure MPC can comprise: receiving (e.g., by a processor) first data from a first MPC node and second data from a second MPC node; processing the first data and the second data into processed data; packing (e.g., by the processor) the processed data into at least one Algorand blockchain transaction; and utilizing (e.g., by the processor) an Algorand protocol to transmit the at least one Algorand blockchain transaction to the second MPC node and the first MPC node. Any or all of the Algorand blockchain transactions of the at least one Algorand blockchain transaction can be an Algorand payment transaction. The Algorand protocol utilized for transmitting the at least one Algorand blockchain transaction can be, for example, a fast gossip protocol. The method can further comprise: recording (e.g., by a relay node) the at least one Algorand blockchain transaction in an Algorand blockchain ledger (e.g., recording the first Algorand blockchain transaction in the Algorand blockchain ledger and recording the second Algorand blockchain transaction in the Algorand blockchain ledger). The transmitting of the at least one Algorand blockchain transaction can be done securely using Algorand secure broadcast channels. The method can further comprise: assigning the first peer (e.g., MPC node, such as the first MPC node (or in some cases a user)) a first Algorand account comprising a first public key and a first private key; and assigning a second peer (e.g., MPC node, such as the second MPC node (or in some cases another user)) a second Algorand account comprising a second public key and a second private key. The first peer can be aware of the second public key, and the second peer can be aware of the first public key. This can be extended to any number of peers, each aware of the public keys of any or all of the other peers. The Algorand protocol can be run on an Algorand network (e.g., a private Algorand network). The Algorand network (e.g., private Algorand network) can comprise a plurality of MPC nodes (comprising the first MPC node and the second MPC node) and a plurality of relay nodes. Each MPC node of the plurality of MPC nodes can connect to at least one relay node of the plurality of relay nodes, and the MPC nodes can be offline nodes that do not participate in the Algorand protocol (and/or in an Algorand consensus protocol, which may be different from the Algorand protocol utilized for transmitting the blockchain transactions) but do send and receive transactions (e.g., Algorand blockchain transactions). The packing of the processed data into the at least one Algorand blockchain transaction can comprise appending the processed data to a respective note field of each Algorand blockchain transaction of the at least one Algorand blockchain transaction (e.g., the packing of the processed data into the first Algorand blockchain transaction can comprise appending the processed data to a note field of the first Algorand blockchain transaction, and/or the packing of the processed data into the second Algorand blockchain transaction can comprise appending the processed data to a note field of the second Algorand blockchain transaction. The respective note field of each Algorand blockchain transaction can have a size capacity of at least 1 kb (e.g., in a range of from 1 kb to 16 kb, or at least 16 kb). Though the example with a first MPC node and a second MPC node has been described extensively, this is for exemplary purposes, and the same features can be extended to any reasonable number of MPC nodes.

BRIEF DESCRIPTION OF DRAWINGS

FIG. 3A shows MPCA nodes connected to all relay nodes. FIG. 3B shows MPCA notes establishing a single link to a relay node.

FIG. 6A shows server sequence Iowa, Oregon, Norther Virginia, Northern California, South Carolina, Ohio, Utah; and FIG. 6B shows server sequence South Carolina, Ohio, Utah, Iowa, Oregon, Norther Virginia, Northern California. In both FIGS. 6A and 6B, the curve with the circle data points is for TCP P2P; the curve with triangle data points is for Algorand with one relay; the curve with solid square data points is for Algorand with two relays; the curve with line data points is for Algorand with three relays; and the curve with the empty square data points is for Algorand with four relays.

FIG. 7A shows results for using seven MPCA servers (e.g., seven MPCA nodes); and FIG. 7B shows results for using three MPCA servers. In both FIGS. 7A and 7B, the curve with the circle data points is for TCP P2P; the curve with triangle data points is for TCP point-to-multipoint (PMP) (TCP PMP); the curve with square data points is for Algorand-4100; and the curve with line data points is for Algorand-16400.

FIG. 8 shows a table of ID and location of MPCA servers.

FIG. 9 shows a table of private Algorand relay nodes.

DETAILED DESCRIPTION

Figure 1:
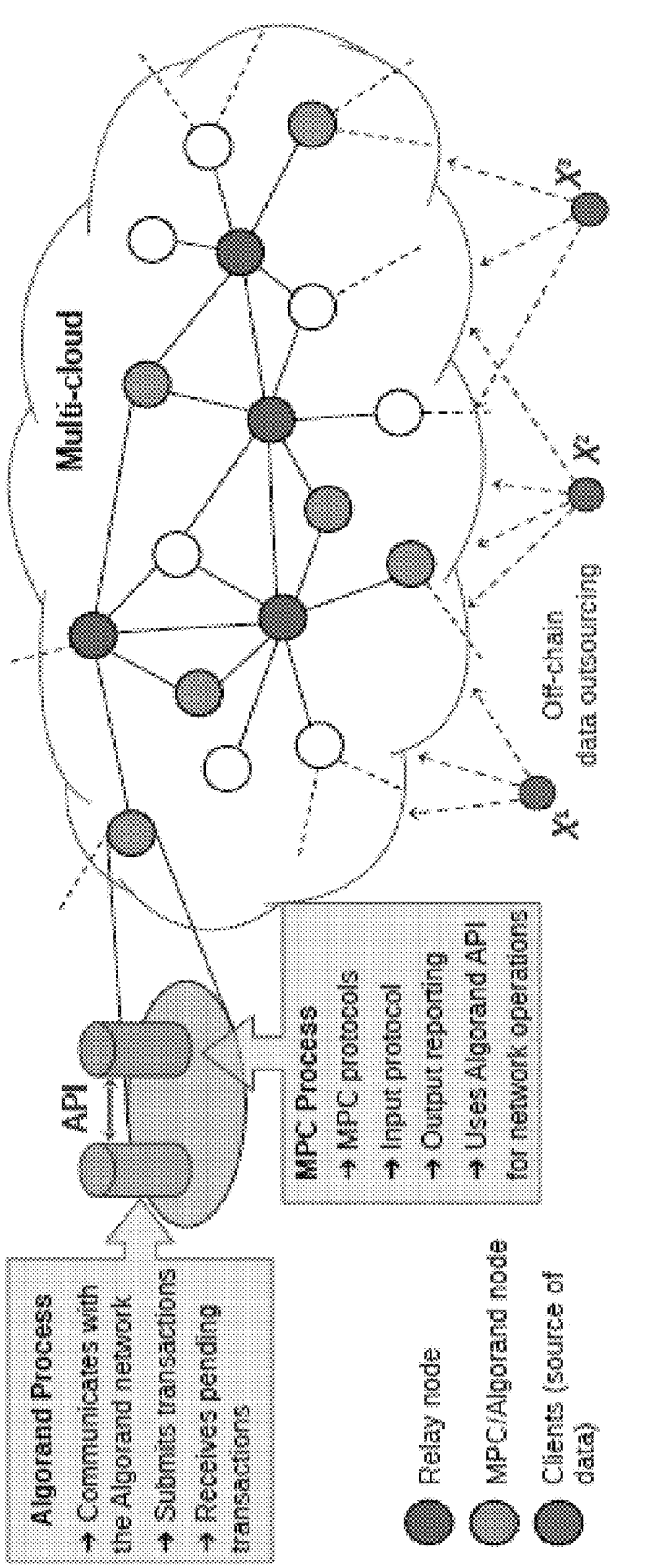
FIG. 1 shows a schematic view of a system for secure multiparty computation (MPC) over a blockchain, according to an embodiment of the subject invention. Although Algorand is listed as the blockchain, embodiments are not necessarily limited thereto.

Embodiments of the subject invention provide novel and advantageous systems and methods for secure multiparty computation (MPC) over blockchain protocol that packs messages into blockchain transactions. For example, MPC can be over Algorand protocol that packs messages into Algorand transactions and utilizes its fast gossip protocol to transmit them efficiently among MPC parties (e.g., MPC nodes). Systems and methods using this approach therefore avoid the complexity and delay associated with fully connected peer-to-peer (P2P) networks while assuring the integrity of the broadcasted data. As a result, this approach effectively reduces the message delivery delay, and hence the total MPC execution time.

The innovative solution of embodiments of the subject invention is integrating a blockchain deployment (e.g., an Algorand blockchain deployment) to an MPC system for the communication among MPC parties. In particular, instead of direct communication between MPC nodes, all message-passing among such nodes is done by attaching a specific message to a blockchain payment transaction (e.g., an Algorand payment transaction). This mechanism enables MPC nodes to exchange messages quickly and securely using the blockchain's secure broadcast channels (e.g., Algorand's secure broadcast channels) while recording them in the ledger, which in turn allows recovering previously transmitted messages when needed. Further, no other party can forge or modify a transaction from a legitimate participant unless it accesses the corresponding private key.

The integration of the Algorand blockchain to an MPC system, according to embodiments of the subject invention, reduces the network complexity associated with the direct P2P connection among all parties. Related art attempts to reduce network complexity do not reduce the communication delay. Also, Algorand blockchain messages are authenticated, meaning that no other party can forge or modify messages while in transit, provided that the sender's private key is secured. Finally, all the communications are stored in the ledger, and other MPC parties can retrieve these messages later for verification or failure recovery.

A private Algorand blockchain network can be deployed. Each party (or MPC node) can be assigned an Algorand account, which includes a public key, also known as the account address, and a private key. All the parties have knowledge of their peers' account addresses so that they can differentiate messages submitted by different parties. Every MPC node is part of the Algorand network, and they run the Algorand process and connect to Algorand relay nodes. Though, they do not participate in the Algorand's consensus protocol. They are what are known as nodes in offline mode as defined by Algorand. The purpose of having these nodes be part of the Algorand network is that they can send and receive transactions as quickly as possible.

The MPC application implements a network module that abstracts the functionality of signing, submitting, and reading transactions into the send( ) and receive( ) methods of the conventional network module. This new network module uses an Algorand SDK to implement the inter-process communication. Such application programming interfaces (APIs) are available at the Algorand website or from the Algorand community for different programming languages.

An MPC party can broadcast a message by appending it to an Algorand transaction's note field (e.g., payment transaction). The maximum size of the note field is 1 kilobyte (kb) by default. Nonetheless, in the private Algorand deployment of embodiments of the subject invention, this limit can be modified (e.g., to 2 kb, 4 kb, 8 kb, 16 kb, 32 kb, or more; for example, to 16 kb) to attach a larger maximum amount of data. Further, the information attached to the node field can include a transaction identifier or sequence number that allows organizing transaction messages during reception. Long messages can split into as many transactions of 16 kb (or whatever the maximum note field size is set to) as needed.

During reception, the MPC application can request the list of transactions that arrived to the MPC node's pool of pending transactions. Next, the MPC process can continue with the execution without further delay. The transactions arriving at the pool can be authenticated using the sender's private key; therefore, it can be trusted that they come from the party associated with the corresponding Algorand account. In addition, there is no need to wait for transactions included in blocks, which would otherwise tremendously increase the application execution time.

Sensitive data such as personal information or company-confidential data are highly valued in research and services. However, many use cases involve computing with data owned or derived by other entities. Although many parties may want to make a decision based on the result of a computation fed with data shared by several entities or stakeholders, they typically don't want to disclose their corresponding personal or confidential information. MPC is a solution to problems of this nature, so the use cases for embodiments of the subject invention are numerous. Some current use cases include: joint analysis with data from multiple sources/databases without revealing any information from the shared records (e.g., extracting several records from a medical database and correlating the information with records from another database); privacy-preserving collaborative statistics; private and decentralized market clearance price; threshold signature (multiple parties jointly signing); and privacy-preserving machine learning, which by itself represents an increasing number of use cases.

In MPC, privacy can be achieved by secret-sharing sensitive values among the MPC parties. At the beginning of the joint computation, each MPC party holds a share or secret of each private value. Then, the MPC parties follow a protocol executed in rounds to perform mathematical functions on these shares. The secret addition is a non-interactive operation. However, other operations, such as multiplication, require the parties to interchange information to compute their respective shares of the result. This network interaction, commonly called a broadcast, allows every party to send the same information to all other parties at the end of each MPC round.

Due to heavy message exchanges, network communication can still be a bottleneck limiting MPC efficiency. Traditional MPC networks comprise peer-to-peer (P2P) links between each pair of nodes. Such a network setup causes the number of connections to increase quadratically with the number of parties, leading to a dramatic increase in the network traffic, and lengthy delays. Consequently, there is a risk of halting due to network/node failures, especially when jointly computing functions with a large number of rounds, posing challenges in terms of robustness. There is subsequently a need to further improve the network performance and robustness to increase the efficiency of MPC's online phase. The candidate network should implement an efficient and reliable broadcast channel. That is, under some assumptions, exchanged messages are not lost or duplicated and are delivered in the order in which they were sent. Additionally, the broadcast channel must be secure, which in this context means that malicious adversaries should not be able to manipulate messages over the network.

Although secure broadcasting has been widely studied in distributed systems, it is not possible to implement it in real networks by strictly following the theoretical approaches. An alternative to realize broadcast communication is to have (n–1) parties send their data to one selected party, which aggregates all the information before sharing them back. Although this communication model has linear complexity, it does not necessarily reduce the delay since the network exchange now takes two consecutive steps.

Embodiments of the subject invention can utilize a blockchain, such as Algorand's fast blockchain (see also Gilad et al., "Algorand: Scaling byzantine agreements for cryptocurrencies," in Proceedings of the 26th Symposium on Operating Systems Principles, ser. SOSP '17, New York, NY, USA: Association for Computing Machinery, 2017, p. 51-68, Online: doi.org/10.1145/3132747.3132757; which is hereby incorporated by reference herein in its entirety) broadcast channels that reduce the network delay while assuring the integrity of the exchanged messages. The protocol of embodiments of the subject invention enables parties to attach their messages to blockchain transactions. The Algorand's gossip protocol can quickly propagate transactions throughout the network at a throughput of 1,000 transactions per second (TPS), higher than what other blockchains can process, such as Ethereum and Bitcoin. The gossip protocol also allows each party to send a message once, instead of sending (n−1) messages as in the case of a P2P network setup.

Embodiments of the subject invention have several advantages compared to related art MPC protocols, including the ability to perform MPC over the private (or permissioned) Algorand blockchain (MPC-ABC) protocol in which MPC parties use the Algorand blockchain for fast and secure message communication. The MP-Algorand integration protocol can enforce in-order delivery of broadcasted messages and optimize the trade-off between the network efficiency and monetary costs of each transaction. A formal performance analysis of the protocol shows that the communication complexity is better than the MPC protocols deployed over conventional P2P network infrastructures. The SPDZ protocol was implemented over multiple cloud service providers (CSPs) and extensive experimental evaluations were conducted (see also Damgard et al., "Practical covertly secure mpc for dishonest majority—or: breaking the spdz limits," in European Symposium on Research in Computer Security, Springer, 2013, pp. 1-18; which is hereby incorporated by reference herein in its entirety). The results using matrix multiplication operations, a core component of machine learning (ML) applications, show that using blockchain broadcasting channels reduces communication complexity and delay.

Related art works in MPC do not speed up the execution time or optimize the network complexity (see, e.g.; Benhamouda et al., "Supporting private data on hyperledger fabric with secure multiparty computation," in 2018 IEEE International Conference on Cloud Engineering (IC2E), 2018, pp. 357-363; and Androulaki et al., "Hyperledger fabric: A distributed operating system for permissioned blockchains," in Proceedings of the Thirteenth EuroSys Conference, ser. EuroSys '18. New York, NY, USA: Association for Computing Machinery, 2018, Online: doi.org/10.1145/3190508.3190538; Gao et al., "Bfr-mpc: A blockchain-based fair and robust multi-party computation scheme," IEEE Access, vol. 7, pp. 110 439-110 450, 2019; and Lu et al., "Honeybadgermpc and asynchromix: Practical asynchronous mpc and its application to anonymous communication," in Proceedings of the 2019 ACM SIGSAC Conference on Computer and Communications Security, ser. CCS '19, New York, NY, USA: Association for Computing Machinery, 2019, p. 887-903, Online: doi.org/10.1145/3319535.3354238; all of which are hereby incorporated herein in their entireties). These related art systems all have issues. Embodiments of the subject invention can rely on Algorand relay nodes to propagate the transactions containing the information shared in every round to speed up network communication.

The main MPC approaches for evaluating a given arithmetic circuit are circuit garbling and secret-sharing. Embodiments of the subject invention can focus on secret-sharing approaches (though embodiments are not necessarily limited thereto), which allow joint computation of arithmetic circuits without learning anything other than the final output of the functions. This category of MPC protocols, including the SPDZ protocol, includes two phases. First, a Preprocessing Phase, also known as the offline phase, generates raw materials to be used in computations in the online phase. The raw materials can include, among others, multiplication triples for multiplication operations, and Message Authentication Codes (MAC) to check the integrity of the computation. Second, an online or efficient phase can evaluate the function. Simple operations on shares, like addition or multiplication by a constant, do not require communication among computation nodes. Nonetheless, communication among parties is required to compute most other operations under MPC. The MAC checking procedure verifies the correctness of the computations because SPDZ assumes a malicious adversary model with up to n−1 dishonest nodes. If MAC checking fails, the parties abort the computation according to SPDZ (see also Bautista et al., "Outsourcing secure mpc to untrusted cloud environments with correctness verification," in 2021 IEEE 46th Conference on Local Computer Networks (LCN), 2021, pp. 178-184; which is hereby incorporated by reference herein in its entirety).

Algorand is a Pure Proof-of-Stake (pPOS) blockchain that provides decentralization, secure transactions, and high scalability at the same time. The Algorand cryptocurrency is called Algo. With respect to the general architecture, the Algorand network mainly includes Relay and Participation nodes that work together to optimize the throughput and decentralization by scaling to millions of participation nodes without degrading performance (see also Algorand-Foundation, "Algorand network architecture," algorand.foundation/algorand-protocol/network, 2021, Online; which is hereby incorporated by reference herein in its entirety). The relay nodes serve as hubs that interconnect all other participation and relay nodes. Their function in the network is to efficiently propagate authenticated messages through high-performance network links (i.e., high bandwidth and low latency). The relay nodes accordingly accumulate incoming protocol messages from the nodes that are connected to them, perform de-duplication, signature checks, and other validation tasks before only re-propagating the valid messages. The participation nodes participate in the Algorand consensus protocol by proposing and voting on blocks on behalf of users (accounts) providing that their corresponding participation key is valid and installed. Communication among participation nodes takes place through relay nodes. The blockchain will not fork even if all the relay nodes are compromised. In a worst-case scenario, the blockchain will slow down or temporarily stall if the voting process is taking a long time to reach an agreement (see also Algorand, "Developer portal," developer.algorand.org/docs/getstarted/basics/why_algorand/, 2021, Online; which is hereby incorporated by reference herein in its entirety).

Algorand additionally allows setting up offline nodes that do not actively participate in running the network and remain in an offline mode. This mode adequately fits the approach of embodiments of the subject invention where it is desired that the computation parties only use their resources to perform the MPC functionality.

Proof of Stake and Byzantine Agreement (BA★) Consensus Mechanism: The BA★ consensus algorithm includes the reduction and binary BA★ phases. The nodes may start the BA★ with a different number of proposed blocks. In the first phase, consensus on several blocks is reduced to a consensus on two finalist blocks. In the second phase, the nodes reach a consensus on one final block using the binary BA★ algorithm.

Algorand Mainnet, Testnet, and Private Networks: Algorand actually provides three public networks (e.g., Betanet, Testnet, and Mainnet). The examples herein focus on the latter two. Mainnet is the primary network that uses assets with a real value, including Algorand's native cryptocurrency, the Algo. Mainnet currently comprises nearly 100 relay nodes distributed in approximately 18 countries, a third of which are in the U.S. Testnet is similar to the Mainnet in that both are public networks running the same version of the protocol. However, the Testnet uses test Algos, and can replenish the accounts for free. The number of deployed Testnet's relays nodes is about ten times less than it is in the Mainnet. Algorand enables users to deploy their own Algorand private network. This deployment offers the most flexible configuration. It can use any available version of the specifications protocol, define any number and location of relay and participation nodes with any distribution of stakes. The deployment time unfortunately is not as quick as setting up a new node in one of the public networks. The private blockchain setup requires the provision of hardware or cloud resources for the blockchain core structure. Nonetheless, the benefits of improving the performance and tailoring the parameters of the configuration amortize the initial setup effort.

The availability of a set $S=\{S_1, S_2, \ldots, S_n\}$ of n MPC nodes connected by secure channels can be assumed. An MPC node can be created as a virtual server hosted by any Cloud Service Provider (CSP). These MPC nodes will either generate their data or receive it from outside parties (i.e., clients) in a secure way. Each node's input data should not be exposed to the other MPC nodes during the MPC process.

Apart from the MPC nodes, the availability of a private (or permissioned) blockchain network (i.e., Algorand) hosted on the clouds, and capable of interacting with the MPC nodes, can be assumed. An MPC node with Algorand communication capabilities can be referred to as an MPCA server or MPCA node interchangeably herein. Further, the Algorand network utilizes relay nodes, which are also hosted on the clouds. The availability of at least two participation nodes to run the Algorand consensus protocol can also be considered.

Embodiments of the subject invention can utilize any MPC protocol that relies on broadcast communication, even though the SPDZ protocol is discussed herein for exemplary purposes. The SPDZ protocol can accommodate a malicious majority, meaning that even if the majority of the nodes collude, the protocol can detect it.

Two types of attacks on the proposed protocol can be considered. Namely, (i) a distributed denial-of service (dDoS) attacks against the Algorand nodes, and (ii) attack on the Algorand network consensus protocol can be considered. For the first type of attack, the case can be considered where the attacker performs a dDoS attack and takes down all but one relay or MPCA node in the private Algorand network. In the second type of threat, it can be assumed that the attacker attempts to manipulate any part of the Algorand protocol. For example, the attack could occur if the attacker has any malicious insider node in the private Algorand network.

An important motivation of the MPC-ABC is to exploit the secure broadcast channels of the blockchain, as a replacement for the P2P communications among MPC nodes. Secure communication in this context means that the messages cannot be forged or modified while in transit. To this end, a blockchain can be integrated into the MPC system, and Algorand can be used due to its efficiency and speed. Specifically, instead of direct communication between MPCA nodes, all message-passing among such nodes is done by attaching a specific message to an Algorand payment transaction. This mechanism enables MPCA nodes to exchange messages quickly and securely using Algorand's secure broadcast channels while recording them in the ledger. Further, no other party can forge or modify a transaction from a legitimate participant unless it accesses the corresponding private key. Each MPCA node uses an Algorand account that interacts with the blockchain network to submit transactions and get transactions submitted by others without participating in the consensus protocol. The MPCA nodes consequently perform the functionality required by the MPC protocol only.

FIG. 1 shows an overview of the hardware and software components of a system according to an embodiment of the subject invention. The system essentially creates a network of n MPCA nodes connected through k Algorand relay nodes, where n and k are integers. The relay, participation, and MPCA nodes are generally hosted on the cloud. The protocol utilizes the broadcast channels of the Algorand blockchain with any general MPC protocol that requires broadcast communication.

All the information broadcasted by the MPCA nodes becomes part of the blockchain. It is thus natural that the organization that owns the MPC application deploys the private Algorand blockchain to control the distribution of the cryptocurrency needed to run the network. When the secure computation finishes, the data stored in the blockchain are no longer needed. The application owner then discards the blockchain's database and eventually sets up a new deployment to execute another protocol.

The newly formulated MPC network has the following main components that are critical to the approach: MPCA node; relay node; and participation node.

With respect to the MPCA node, the main component of the system is the extended MPC nodes that can integrate with Algorand application programming interfaces (APIs). The new node is referred to as an MPCA node, which primarily executes the Algorand and the MPC processes. The former process establishes communication with the Algorand relay nodes to submit and receive blockchain transactions and implements a local pool of transactions pending for confirmation. The MPC process executes the MPC protocol and communicates with the Algorand process via an API to execute network-related operations.

With respect to the relay node, the primary purpose of the relay nodes is the secure and efficient propagation of Algorand transactions and messages throughout the Algorand network using a gossip protocol. Relay nodes also store the whole ledger, which offers an additional feature that could be leveraged to improve MPC robustness. For instance, the relay nodes can respond to requests for previous transactions, which enable MPC failure recovery.

With respect to the participation node, these nodes keep the Algorand network running by proposing and voting on new blocks. Accordingly, participation nodes do not play a direct role in the MPC protocol. Having several participation nodes makes the blockchain more robust by allowing the consensus protocol to run successfully even with the unavailability of a number of these nodes.

The implementation of message broadcasting among MPC parties is done traditionally by establishing transmission control protocol (TCP) P2P links between them. When a party needs to send information to the rest, it sends the message individually and consecutively through each of those links. However, this setup is not scalable because the number of communication links increases exponentially with the number of MPC parties.

In embodiments of the subject invention, the MPCA nodes are part of the Algorand network and are connected to a set of Algorand relay nodes. The number of links that each MPCA party needs to establish is equal to the number of relay nodes in the worst case. The number and location of the relay nodes in the system depend on factors, such as the number of MPCA nodes and their geographical location.

Additionally, the delay of the links associated with the relay nodes is a crucial factor when considering maximizing the network performance.

At least two relay nodes can be deployed to provide some level of redundancy. When the number of MPCA nodes increases, it is natural to increase the number of relay nodes as well. Nonetheless, the MPCA nodes do not need to establish a direct connection to each relay node. Instead, the relay nodes efficiently propagate the transactions received from MPCA nodes and other relay nodes.

With respect to reading MPC-Algorand transactions, the time it takes to confirm a block in the Algorand network is approximately 4.5 seconds(s), which is very short compared to other blockchain technologies (e.g., Bitcoin, Ethereum, and others). Yet, the delay cannot be minimized if the user waits for a block to be confirmed. Instead, an approach can be followed that relies on Algorand's gossip protocol, which efficiently propagates transactions through the Algorand network and makes them available at each of the Algorand nodes. Specifically, the transactions accumulate in each node's pool of transactions pending confirmation into a block that is to be added to the ledger. Participation nodes perform this confirmation by running the consensus protocol, which involves proposing and voting on a new block. Because these pending transactions are available at each node, the MPC process queries them through the Algorand node's API. In order to request the list of transactions, the MPC process makes an authenticated API request to the Algorand process. The later process replies with the available transactions in the corresponding node's pool. These API interactions occur within the local host; hence, the communication delay is negligible.

The justification for using the transactions before they are written into a block is that an MPCA node uses the sending account's private key to sign a transaction submitted to the Algorand network and pays a fee proportional to the transaction's size in bytes, including the note's field bytes. Subsequently, the relay nodes verify that the sender has enough balance to pay the transaction fee and use the sender's public key (i.e., their account address) to verify that the transaction signature is correct before propagating the message throughout the Algorand network. Therefore, transactions in the nodes' pools of pending transactions, including the MPCA nodes' pools, can be used right away by the MPC process. These transactions are always included in the upcoming blocks.

Using the transactions payload with a very short delay is critical to improving the MPC system's efficiency. Additionally, the transactions and corresponding payloads are confirmed into blocks a few seconds later.

With respect to separation of streams and ordering, the substitution of the TCP-based communication with a new communication based on messaging through discrete transactions raises two challenges: 1) the identification of the sender; and 2) the ordering and synchronization of the messages. TCP is a connection-oriented protocol, with a defined origin and destination determined by an internet protocol (IP) address and TCP port number. On the other hand, with the use of the Algorand broadcast channel, broadcast communication can be implemented that allows identifying the message originator.

Embodiments of the subject invention can use account addresses to identify the origin of transactions. MPCA nodes use their particular account address to submit transactions during the MPC execution. Each MPCA node knows the addresses assigned to each of the other nodes. Any MPCA node can therefore identify transactions from the local pool and continue the MPC execution once all transactions for a specific round have been received and processed.

Figure 2:
FIG. 2 shows a structure of MPC messages that can be used in accordance with embodiments of the subject invention. The message can include field elements (FEs) shared in a blockchain (e.g., Algorand blockchain) transaction's note field.

TCP is a reliable communication protocol that guarantees that the packets are delivered in the correct order to the destination node's application layer, no matter what route each packet took from source to destination. Moreover, it automatically splits the packets if they are too large to be transmitted through a specific link. The application using this communication channel merely delivers a stream of bytes to be sent through a specific TCP port. The TCP protocol then guarantees that they are received in the same order at the destination. In contrast, with Algorand transactions are prepared and sent with a limited amount of information attached to it. In order to recover this information with the correct sequence, the content of the message can be structured in a simple way that is enough for what is needed. FIG. 2 shows the manner in which the first six bytes of a given message are reserved for an MPC message identification (ID) implemented as a sequence number that identifies the specific transaction. This sequence number and the sender address are enough to correctly allocate this message's information. When splitting the message containing all the information that a given MPCA node submits to the network, this message can be split according to the maximum number of bytes attached to a single transaction. Specifically, the number of big integers that fit in a single transaction can be calculated after deducting the six bytes reserved for the sequence number, and the message can be split keeping whole big integers in any given transaction. For instance, if the MPC system operates on a field of size p, where $\log(p)=128$, the message is split so that the maximum number of blocks of 16 bytes (128 bits) fits in a single transaction.

On the receiving stage, all messages are organized per sender (sender's address) and by their sequence number. This operation emulates the TCP protocol's underlying mechanisms, which differentiate TCP streams by a port number and deliver the packets in the correct order. From this point, the MPC application processes the messages according to the MPC protocol's rules, and the execution continues.

There is a mechanism in Algorand that throttles the amount of data (such as transactions and smart contracts) submitted to the blockchain. Algorand consolidates new transactions in pools located on every Algorand node. When the size of the pool increases, the Algorand node increases the fee per transmitted byte exponentially so that nodes have to pay more to submit new transactions. This regulation mechanism maintains the amount of data in the pool of pending transactions at a moderate level. At the same time, the consensus protocol alleviates the pool by confirming those transactions and adding them to blocks. This regulation mechanism is especially useful in the public blockchain since there is not much control of the timing at which different users post transactions. For example, a surge in incoming data may significantly delay the transactions from other users.

Nonetheless, this mechanism does not need to be enabled in embodiments of the subject invention because it would make it more challenging to calculate the amount of cryptocurrency to allocate to every MPCA node to pay fees. Eventually, the computation may halt due to low account balance. Additionally, the Private Algorand deployment is much more controlled, the users are well known, and the specific MPC protocol controls the posting of new transactions. In summary, the exponential increase of the transaction fee can be disabled by setting the corresponding parameter to 1 (i.e., keeping it flat), making it easier to calculate the amount of cryptocurrency to allocate to the MPCA nodes for transaction spending.

When the data size used in the secure computation is significantly increased (for instance, matrix multiplication), the networking module in MPC-ABC has to split the data that each MPCA node shares in a single round into multiple transactions. This data splitting results in a substantial increase in the total number of transactions submitted to the blockchain. Therefore, some of the Algorand parameters can be adjusted to optimize its broadcasting performance as follows:

Size of the note field: The MPC data shared on every round is attached to the transaction's note field. The size of this data depends on different factors, like the protocol, the function computed, the field size, etc. For instance, in order to multiply two secret-shared values using the SPDZ protocol, each node generates a pair ($\epsilon_i$, $\delta_i$) which are elements of a finite field $Z_p$. Therefore, assuming a size of 128-bit (16 bytes) for this field, each node broadcasts 32 bytes per multiplication. Performing parallel operations can quickly fill the maximum 1 kilobyte (KB) that can fit into a transaction. The networking module splits large amounts of data into as many transactions as needed and then sends them continuously. As shown in the examples, increasing the size of the note field can further minimize the delay.

Maximum block size: This size specifies the maximum number of bytes that the Algorand consensus protocol uses to propose and confirm a new block. The block size and block time define the blockchain throughput, which is the transaction bytes that the blockchain can process in a period. In MPC, especially when continuously computing large amounts of data with several parties, the network traffic becomes so high that it can easily exceed the Algorand blockchain throughput. Therefore, the maximum block size can be increased to process more data in the same period.

The number of messages exchanged during a transaction propagation and any Algorand's related messages, such as those generated in the consensus, can be analyzed for communication complexity. However, as previously discussed, the user cannot wait on the blocks to be confirmed before reading the transactions. Instead, the pool of pending transactions propagated by the gossip protocol can be directly accessed. Therefore, the consensus protocol does not affect the MPC communication complexity.

The MPC system can consider n MPCA nodes connected to k Algorand relay nodes. Assume for now that all of the MPCA nodes have a direct connection to each of the relay nodes, although it is not strictly necessary. It can be immediately seen that the complexity of the communication corresponding to direct connections to/from MPCA nodes is O(kn). Additionally, the relay nodes are connected to each other, and thus the maximum number of links in the mesh network they form is k(k−1)/2 (i.e., O(k²)). Overall, it could be said that in the worst case, the communication complexity of the new network is the sum of those two separate costs. Nonetheless, the way messages are exchanged in Algorand and the different topologies created, additional items would need to be considered for average-case scenarios. For instance, not every MPCA node needs to establish a direct link to every relay node. As long as there is communication with a single relay node, any MPCA node can communicate with the rest. Further, the relay nodes are not required to establish a full mesh network by connecting directly to every other relay. Nonetheless, the less they are connected, the more time it will take the gossip protocol to propagate the transactions submitted to the Algorand network. To this end, a calculation of the communication complexity for two particular network topologies can be derived as follows.

All MPCA nodes connected to every relay node: In the scenario depicted in FIG. 3A, each MPCA node establishes k links, i.e., one link to each of the relay nodes. Note that there is exactly one hop between any two MPCA nodes in this scenario. At the end of each MPC round, each MPCA node submits transactions and reads transactions from other nodes through each of the k links. Therefore, the communication complexity in this scenario is O(kn). In other words, the complexity attributed to the propagation of transactions throughout the relays' network with complexity O(k²) occurs in parallel and it does not add to the MPC communication delay.

Figures 3A, 3B:
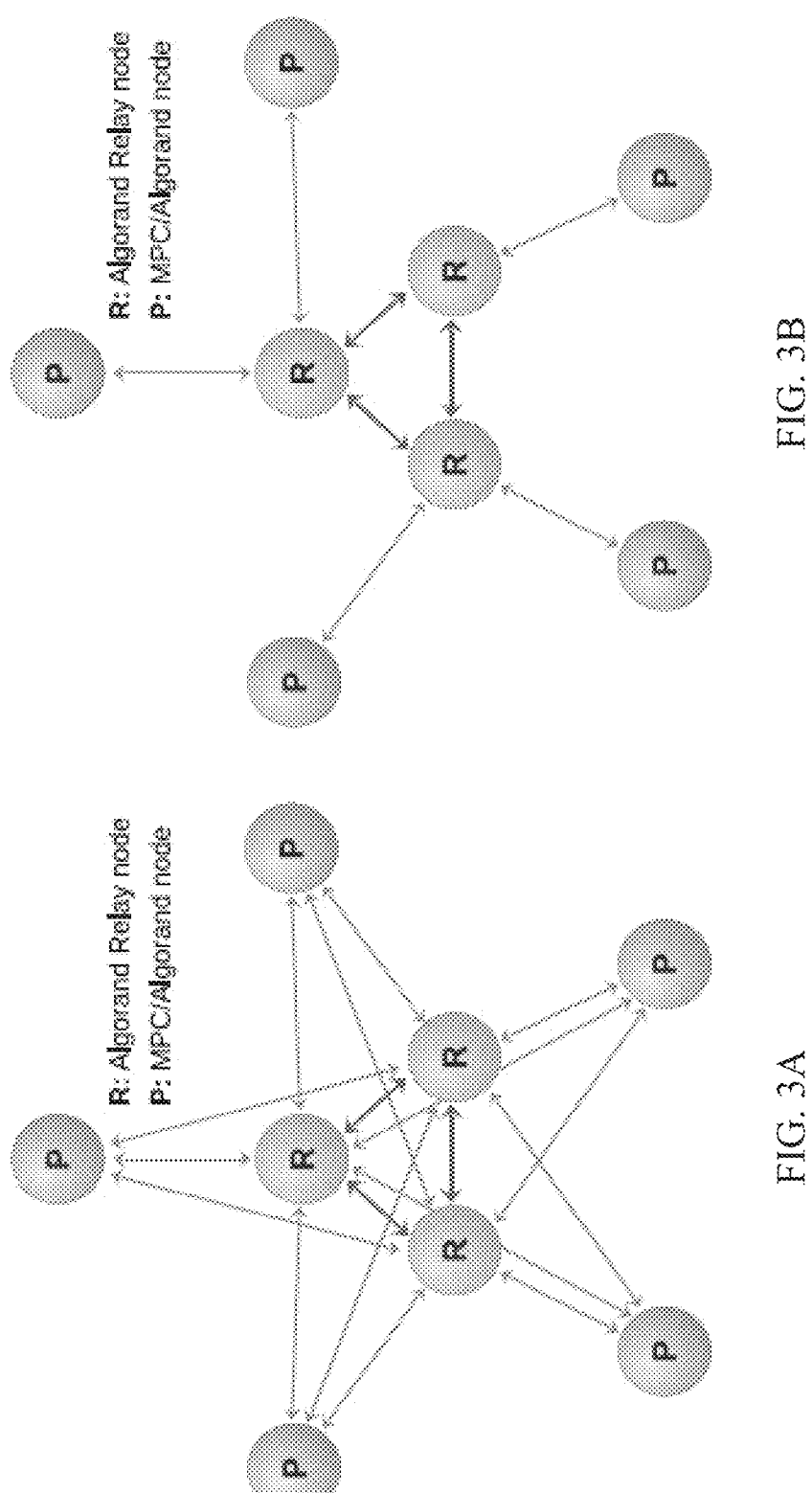
FIGS. 3A and 3B show example network setups between Algorand relay nodes and MPCA nodes, where an MPCA node is an MPC node with Algorand communication capabilities.

Each MPCA node connected to any single relay: The main difference between this scenario and the previous one is that any MPCA node is connected to a single relay node, as shown in FIG. 3B. Each MPCA node sends its transactions through a single connected relay. Next, the relays propagate their transactions to the other nodes directly connected to them, either relays or MPCA nodes, by running the gossip protocol. It can be seen that the communication complexity in this scenario is O(k²)+O(n). Assuming that the number of relays is fixed, k can be considered constant. Thus, it can be concluded that the communication complexity increases linearly with n.

In the case of the current P2P solutions, each MPC node needs to establish a direct connection with each other. Therefore, the setup requires n(n−1)/2 links, and the complexity is O(n²).

The delay performance of the P2P and MPC-ABC approaches can be analytically examined. In both scenarios, it can be assumed that each MPC node $$P_i^k$$

intends to distribute a chunk of data $d_i$ to all other n−1 MPC nodes. Hence, there exist n(n−1) messages to be transmitted. The exchange of messages is assumed completed when all messages arrive at the targeted destinations. A main focus is to compute an estimate of the delay bounds of the MPC-ABC and compare it with the P2P setup. In the analysis, only the number of required connections are focused on. The model can be extended given other parameters, such as the processing times in nodes, queuing delay, and different MPC-ABC network architectures. The following analysis provides enough justifications about why MPC-ABC outperforms traditional P2P models.

P2P Approach: In this case, each server should send a copy of $d_i$ to each of the n−1 peers. Hence, node $P_i$ needs to establish n−1 duplex connections from node $P_i$ to node $P_j$, which exhibit different delays depending on the nature of the connections on the Internet. Let $T_{ij}$ be the delay from MPC node $P_i$ to MPC node $P_j$. Given the number of MPC nodes, $$\mathcal{T}^{PP} = \left\{ T_1^P, T_2^P, \dots, T_{n(n-1)}^P \right\}$$

is defined as the set of connection delays in this approach. In other words, the set of $T^{PP}$ includes n(n−1) random values, representing the values of delay between n MPC nodes in the P2P approach.

MPC-ABC Approach: This starts with a simplified model where the MPCA nodes are uniformly distributed among k relay nodes. Conversely, each relay node is connected to n/k MPCA nodes. Hence, n connections are established from relay nodes to MPCA nodes. Moreover, in order to have a fully connected network of relay nodes for high-speed exchange of messages, it can be assumed that all k relay nodes are connected similarly to a P2P network. The set of delays of all required connections can be equivalently represented by $$\mathcal{T}^{MPC''-ABC} = \left\{ T_1^P, \dots, T_n^P, \dot{T}_1^R, \dots, T_{k(k-1)}^R \right\}.$$

Note that all communications run in parallel.

In the first analysis, the required time of task completion in P2P ($T^C_{P2P}$) and MPC-ABC ($T^C_{MPC-ABC}$) approaches can be estimated as follows:

$$T_{P2P}^C = \max_{T_i} \mathcal{T}^{PP}, i \in \{1, \dots, n(n-1)\} \tag{1}$$

$$T_{MPC-ABC}^C = \max_{T_i} \mathcal{T}^{MPC-ABC}, i \in \{1, \dots, 2n + k(k-1)\} \tag{2}$$

Referring to Equations (1) and (2), the required time to complete the sharing exchange is defined by the maximum delay of the required connections in each approach.

For a random sample as above (m samples equal to n(n−1) or 2n+k(k−1)), with a cumulative distribution $F_T(t)$, the order statistics for that sample have cumulative distributions as follows (where r specifies which order statistic):

$$F_{T_{(r)}}(t) = \sum_{j=r}^{m} \binom{m}{j} [F_T(t)]^j [1 - F_T(t)]^{m-j} \tag{3}$$

Now two delay bounds can be defined that are important to approximate the speed of computations in both P2P and MPC-ABC approaches:

$$Prob(\max\{T_1, \dots, T_m\} \le t) = (F_T(t))^m \tag{4}$$

$$Prob(\min\{T_1, \dots, T_m\} \le t) = 1 - (1 - [F_T(t)])^m \tag{5}$$

Equation (4) condescendingly computes the probability of having a maximum delay smaller than a given bound. We assume that the amount of delay is uniformly distributed between $\{T_{min}, T_{max}\}$. Then, in order to find the value of $T^C_{MPC-ABC}$ and $T^C_{P2P}$, order statistic bound Equation (4) can be applied. Given the maximum definition, Equation (4) can be rewritten as:

$$Prob(\max\{T_1, \dots, T_n\} \le t) = \left( \frac{t - T_{min}}{T_{max} - T_{min}} \right)^m \tag{6}$$

Equation (6) shows that the maximum bound of delay is a function of the number of connections. This shows that the probability of having delay smaller than a given value in the P2P approach (m=n(n+1)) is smaller than the delay in the MPC-ABC approach (m=2n+k(k+1)).

For a security assessment, it can be assumed that an attacker's targets are the relay nodes to make them inoperative within the MPC-ABC system. Because the participation nodes perform the consensus algorithm in the Algorand Blockchain, attacking relay nodes would not stop MPC-ABC, and MPC nodes can still communicate even with a single functioning relay node.

Without loss of generality, it can be assumed that a given set of attackers can successfully attack n' relay nodes. If the proposed architecture in FIG. 3A is used, where all nodes are connected to all relay nodes, this attack cannot be successful while n'<k. Specifically, the probability of a successful attack can be easily minimized by increasing the number of relay nodes. Although successful attacks against the relay nodes will degrade the computation speed, they cannot halt the network or break the security of the MPC. Therefore, a fully connected network of relay nodes can be deployed in a secure private network to increase the resiliency against such attacks. Moreover, the relay nodes can be deployed across different CSPs to minimize the collusion risk. Relay nodes can also be regularly replaced with new ones between computations. This defense mechanism is called moving target defense and makes it more difficult for the attacker to find the victim relay nodes. Accordingly, it is possible to redesign the network's topology to prevent or inhibit fixed-targeted attacks dynamically.

Assume that an attacker can control an MPCA node. The attacker thus can (i) manipulate computations, (ii) flood the network with fake transactions, and even (iii) turn off the MPCA node (note that the latter can take place by DDOS attack as well). First, MPC-ABC can verify the correctness of the results at the end of the computation. That means any deviation of the protocol can be detected, notwithstanding the MPCA nodes should restart the computation. If the attacker tries to send fake transactions to reduce the speed of computations, it can be easily detected with the help of relay nodes. The relay nodes are informed about the number of transactions in each epoch. They can hence provide alerts to the administrator as soon as a given MPCA node irregularly increases the number of transactions. The administrator can then revoke the node from the network and replace it with a new one.

Second, because Algorand is a PoS blockchain protocol, the attacker cannot run any successful attack by possessing less than one-third of the Algos in the network. The attacker thereupon can never take down the consensus protocol if secure repositories for two-thirds of the Algos can be made (e.g., having them in the primary node located in a local network). This provision also guarantees that the transactions read from the nodes' pools will finally be committed to Algorand blocks, as participation nodes can perform the consensus algorithm without problems.

Embodiments of the subject invention provide a focused technical solution to the focused technical problem of reducing message delivery delay during MPC by utilizing blockchain protocol to pack messages into blockchain transactions over a blockchain network. Embodiments of the subject invention improve the computer system performing MPC by reducing total MPC execution time and therefore conserving computing resources.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The experimental MPC system was set up on the public clouds to evaluate the approaches of embodiments of the subject invention. Seven nodes were configured over different and untrusted CSPs that are geographically distributed across the U.S. Although using multi-cloud deployment minimizes the possibility of collusion among the MPCA nodes, it significantly affects the performance. The experiments on this cloud environment considered real network conditions to validate the practicality of the approach (e.g., communication over the internet, and actual network connection characteristics, such as bandwidth, delays, etc.).

Figure 4:
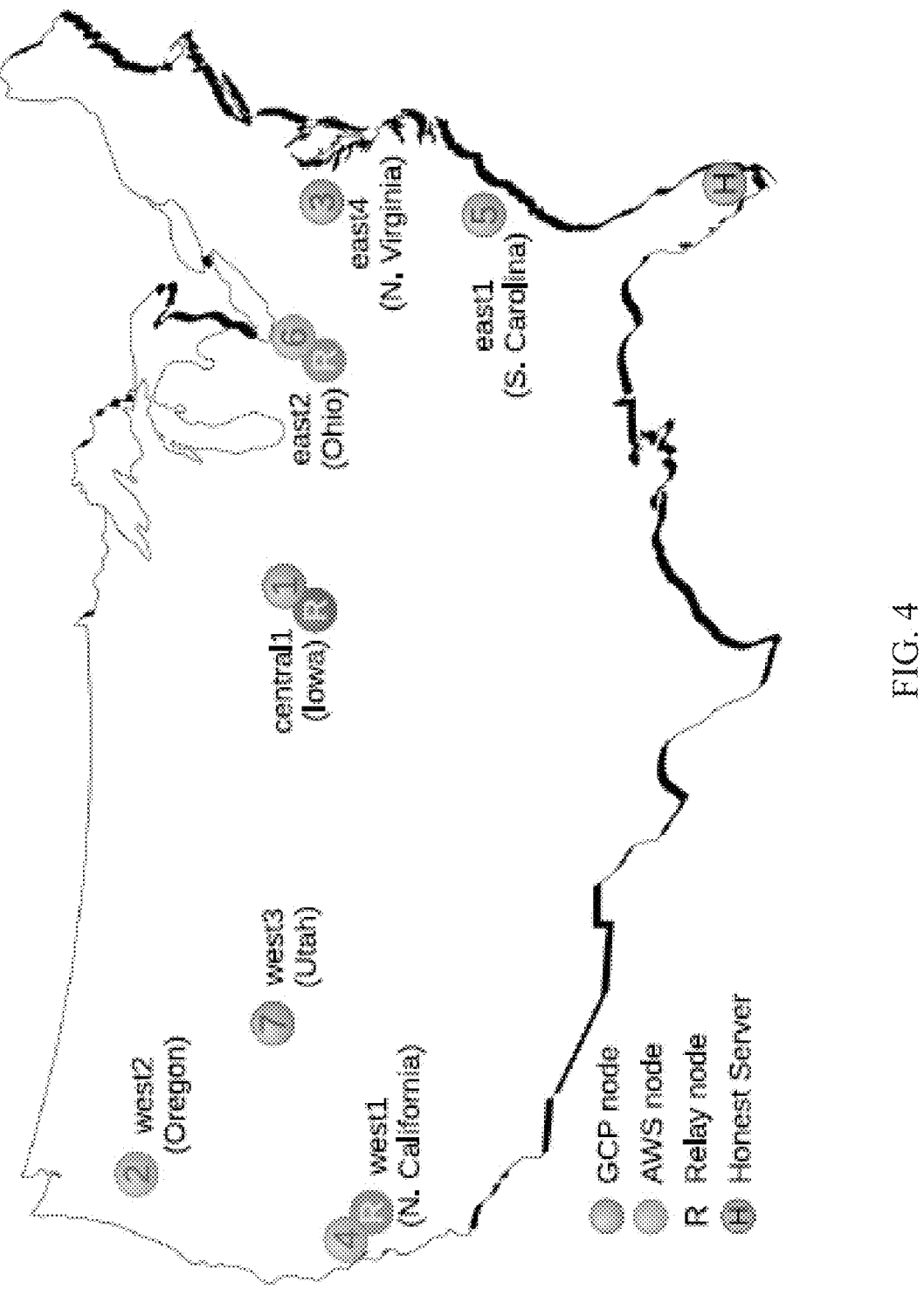
FIG. 4 shows a schematic view of deployment of an MPC-blockchain (e.g., MPC-Algorand blockchain) system on the public cloud, according to an embodiment of the subject invention. The MPC nodes (e.g., MPCA nodes) are identified by their respective node IDs.

A private Algorand network was deployed on the same cloud environment that hosts the relay and participation nodes. The relay nodes were deployed in various locations and the performance was measured to study how the different deployments of the nodes can affect the delay. The hardware configurations for the Virtual Machines (VMs) used to deploy the Algorand relay nodes are GCP machines type e2-medium (2 vCPUs, 4 GB RAM) with 15 GB of storage, and Amazon Web Service (AWS) machines type t3.medium (2 vCPUs, 4 GB RAM) with 15 GB of storage as well. The MPCA nodes use the same hardware configuration except for the storage that was set to 10 GB. Additionally, an Honest Server off-cloud (on-premises) was configured to orchestrate the pace of execution of continuous MPC tasks and collect the shares of the results at the end. An overall picture for this setup is shown in FIG. 4.

A Python MPC application was developed that implements the online phase of the SPDZ protocol. It was assumed that an offline phase produces the raw materials and are available in each MPCA node to be consumed during the online phase. Fixed-point arithmetic was implemented for matrix multiplication for the online phase (see also Catrina et al., "Secure computation with fixed-point numbers," in Financial Cryptography and Data Security, R. Sion, Ed. Berlin, Heidelberg: Springer Berlin Heidelberg, 2010, pp. 35-50; which is hereby incorporated by reference herein in its entirety). This application uses the Python Algorand SDK to communicate with the Algorand process running in the same node (see also Algorand, "Python algorand sdk," py-algorandsdk.readthedocs.io/, 2021; which is hereby incorporated by reference herein in its entirety).

An extensive list of experiments was performed to study the impact of different variables and configurations on performance with respect to numerous approaches. The main benchmark used in this case was the MPC nodes' communication using TCP P2P links. The main performance metric was the total computation completion time.

Example 1

Figure 5:
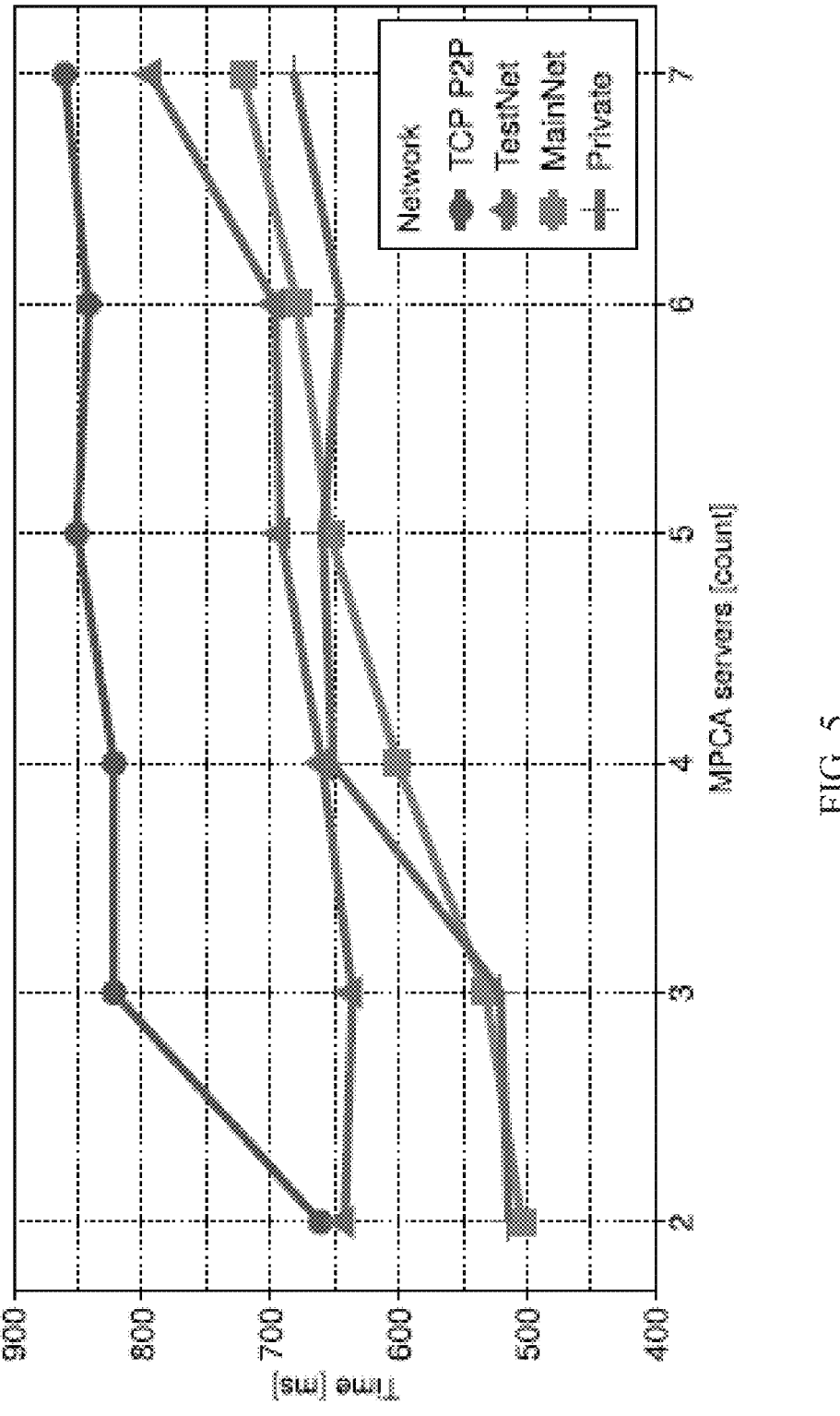
FIG. 5 shows a plot of time (in milliseconds (ms)) versus MPCA server count, showing a comparison of MPC delay performance over different network setups. The curve with the circle data points is for Transmission Control Protocol (TCP) peer to peer (P2P) (TCP P2P); the curve with triangle data points is for TestNet; the curve with square data points is for MainNet; and the curve with line data points is for Private.

The performance of the Mainnet network, Testnet network, and the Private Algorand network according to an embodiment of the subject invention were compared using a secure arithmetic operation that takes nine rounds. The system computes 16 parallel multiplications on integer values on each round. The results in FIG. 5 show the average of several experiments for a different number of MPCA servers. The locations of the MPCA nodes are indicated in The table in FIG. 8. The performance of the MPC-ABC was compared against the conventional MPC over TCP P2P communication channels.

The performance of Testnet outperformed the P2P benchmark for all cases. Nonetheless, Mainnet and the Private Algorand add an additional margin of improvement over Testnet. Mainnet and the private Algorand perform similarly with small variations in a couple of cases, mainly due to the differences in the number and location of relay nodes in both networks. Slight changes in network conditions across experiments would also affect the results with a minor level of impact. There were very few relay nodes in Testnet (specifically nine relay nodes distributed in a few countries at the time of these experiments), and the system randomly selected up to four relay nodes by default. For Mainnet, the availability of relay nodes is higher, and the nodes can use routes with lower delay to make their transactions available to the other MPCA servers. Finally, for the initial private Algorand network, a single server hosted on AWS region east2 (Ohio) was used. In this case, all the transaction messages pass through this single relay node, and its location proves to be suitable for all these MPCA nodes' locations.

In summary, the use of the Algorand network outperformed the use of conventional TCP P2P links in all cases. While the results also show that Mainnet or a private network can be used, using the private Algorand network is advantageous because it does not acquire cryptocurrency to pay for transactions, as in the Mainnet. The private Algorand network has a supply of cryptocurrency upon creation. This supply is distributed according to the application's needs. Thus, in the remaining experiments, the Algorand private network will be utilized.

Example 2

The impact of the number of relay nodes on the broadcasting performance of the MPC system according to an embodiment of the subject invention was studied. First, the same secure computation was performed using the setup from Example 1. Then, one more relay node was gradually added to the private Algorand network, repeating the experiments for each case. More relays were progressively added to the network in the order indicated in the table shown in FIG. 9.

Figure 6A:
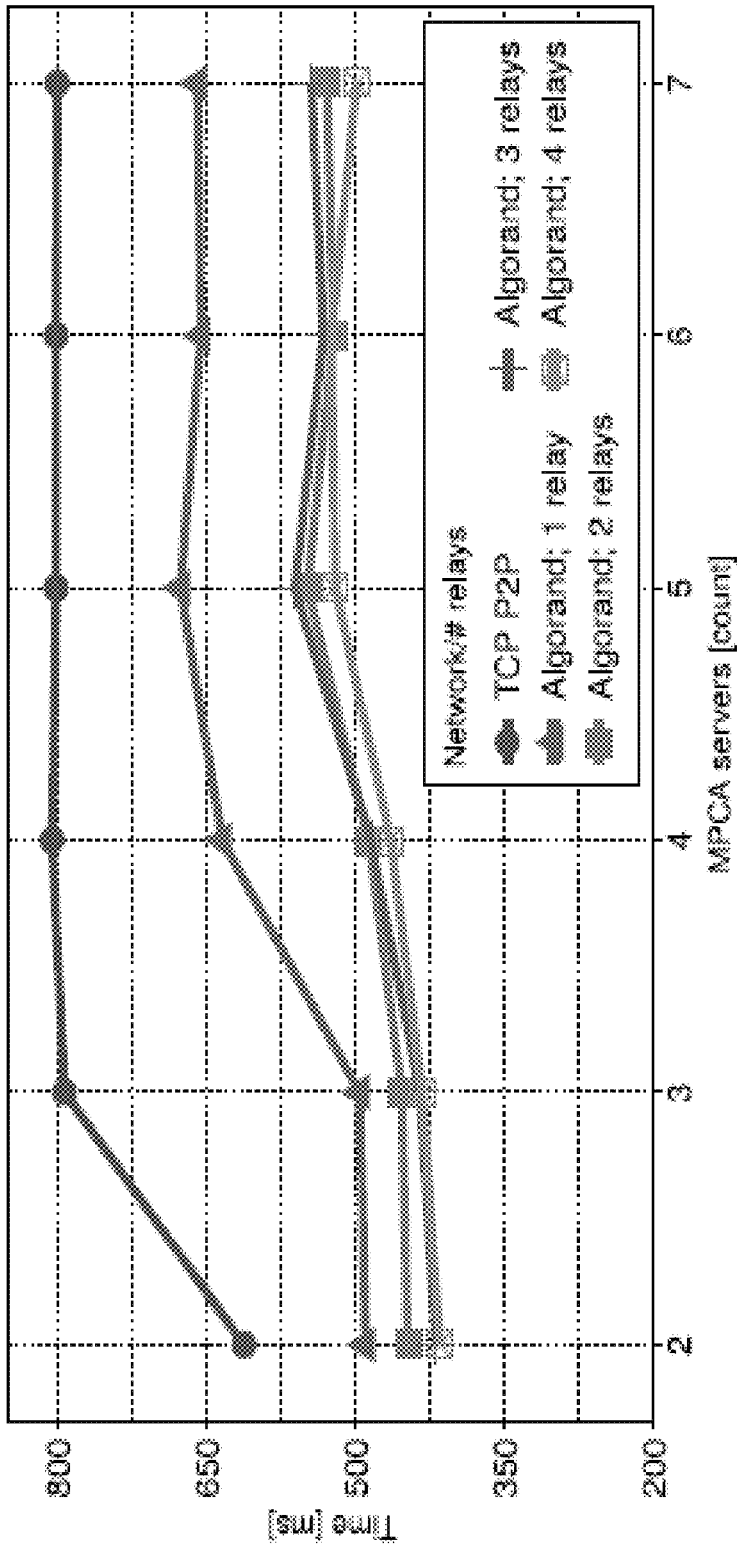
FIGS. 6A and 6B show plots of time (in ms) versus MPCA server count, showing the effect of the number of relays on the execution time of MPC over private Algorand.
Figure 6B:
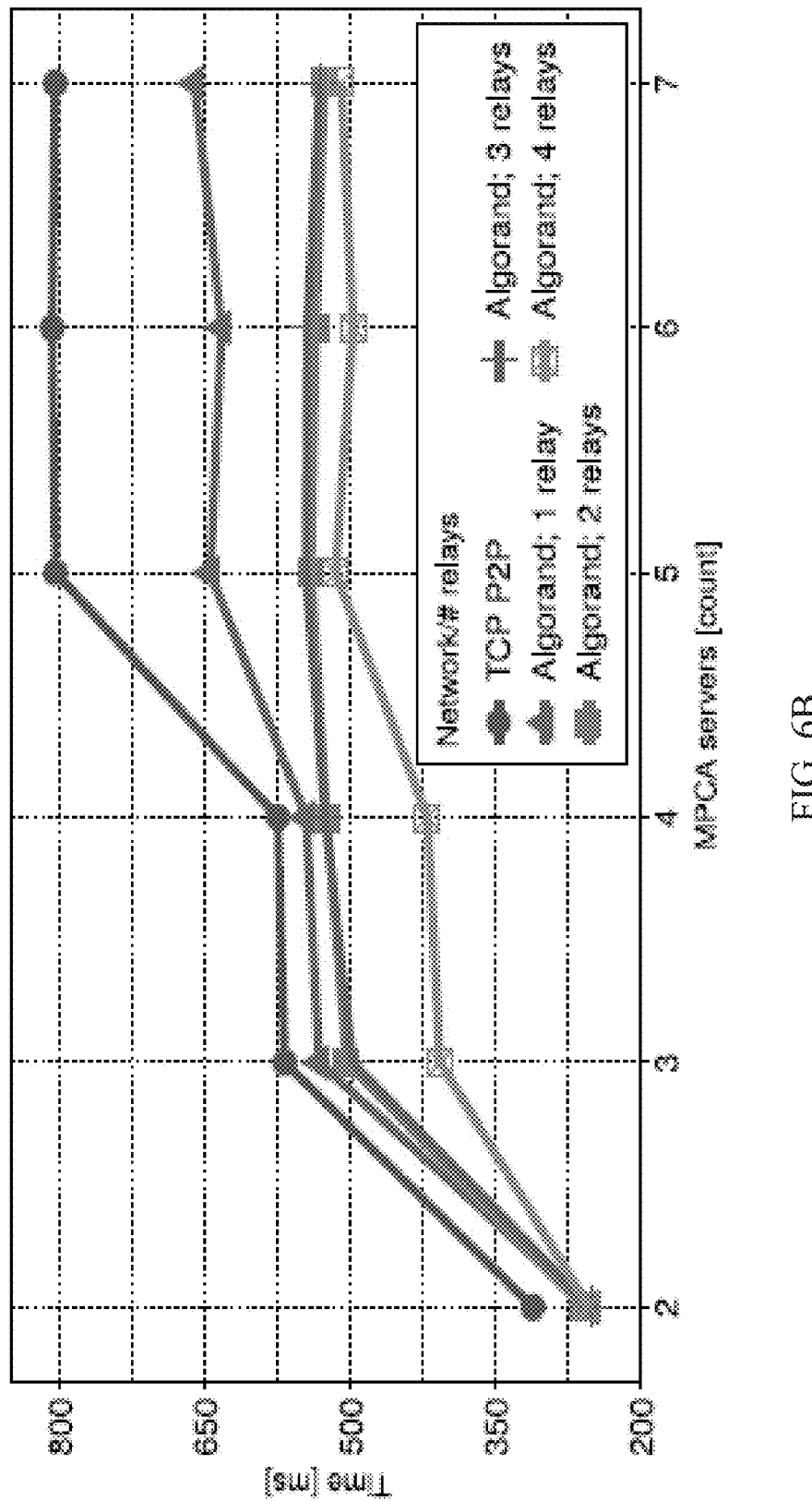

FIGS. 6A and 6B show that after adding a second relay (AWS-California in this case), the performance in terms of propagation delay improved for all cases. Focusing first on FIG. 6A, the general average of improvement compared to TCP P2P across all tests with a different number of MPCA servers was around 22% with one relay node and around 35% when using 2 or 3 relay nodes. It may appear that adding a third relay did not improve the performance further. Nonetheless, it was observed that the relay's location also affects the results. When adding a fourth centered relay located in Iowa, a general improvement of 38% was obtained, which represents a marginal improvement over the case that uses three relay nodes.

The delay of execution using conventional TCP P2P network connections showed a notable increase when using 3 MPCA servers compared to just two servers. Then, it stayed constant for 3 to 7 MPCA servers. One would typically expect that the delay increases with the number of parties. However, when testing on different geographically distributed locations, the real network delays had a much more representative effect on the overall system performance. Specifically, when three MPCA nodes were used, there were three delays to consider: Iowa-Oregon, Iowa-N. Virginia, and Oregon-N. Virginia. It can be concluded that the delay between the cloud locations Oregon and N. Virginia is the largest delay $D_{max}$ in this case. Hence, adding more MPCA servers in a location from which the maximum delay to any other MPCA server is lower than $D_{max}$, will not significantly impact the overall performance.

In FIG. 6B, the same MPCA nodes' locations were used, but they were added to the setup starting with locations GCP-S.Carolina and AWS-Ohio. More MPCA servers were then gradually added following the same sequence in the table in FIG. 8. When the third MPCA node (GCP-Utah) was added, it was noticed how the delay increased as expected, but then when the fourth MPCA server located in GCP-Iowa was added, it was observed that no notable increase in the delay occurred. This lack of increase is because the new location geographically sits between all other locations. Therefore, it would be expected that its delay to or from the other nodes would not to be higher than the delay between Utah and the far east locations. The situation changed when adding a fifth MPCA server (AWS-Oregon). It had already been noticed that the delay between Oregon and N. Virginia in the previous case determined the overall delay performance. Further, the MPC delay using the private Algorand network outperformed the use of conventional TCP P2P channels for any number of MPCA nodes in the second scenario too. For instance, the average improvement across all MPCA servers data-points is nearly 15% with one relay node, around 23% for 2 and 3 relay nodes, and finally nearly 31% for 4 relay nodes.

In general, the relays contribute to this improvement by consolidating and forwarding messages. Additionally, during the execution of the gossip protocol, they accumulate and de-duplicate messages (transactions), optimizing the available bandwidth.

Example 3

The system according to an embodiment of the subject invention was also tested on secure multiplication of matrices with different sizes. This operation is a core component of several machine learning applications, including linear and logistic regression. Therefore, matrices with fixed-point elements were considered using eight fractional bits. In this evaluation, the conventional technique for matrix multiplication with complexity $O(n^3)$ was implemented. Because a main contribution is about improving the efficiency of the underlying network, which is independent of the computed function, the system can therefore be applied to any other MPC protocol or technique.

The setup for this experiment comprised seven MPCA nodes in the same locations and just three Algorand relay nodes as shown in FIG. 4. The experiments included tests using Algorand transactions with 4100 bytes and 16400 bytes note field sizes, which define the number of transactions each MPCA submits at each round. In addition to the TCP P2P network setup, also included, as a benchmark, was the results of the experiments with TCP Point-to-Multipoint (PMP). This case is an implementation where one MPC node receives the communication from the rest, aggregates the shares for the different values, and then broadcasts the result to all nodes (see also Fernando et al., "Secure massively parallel computation for dishonest majority," in Theory of Cryptography, R. Pass and K. Pietrzak, Eds. Cham: Springer International Publishing, 2020, pp. 379-409; which is hereby incorporated by reference herein in its entirety).

Figure 7A:
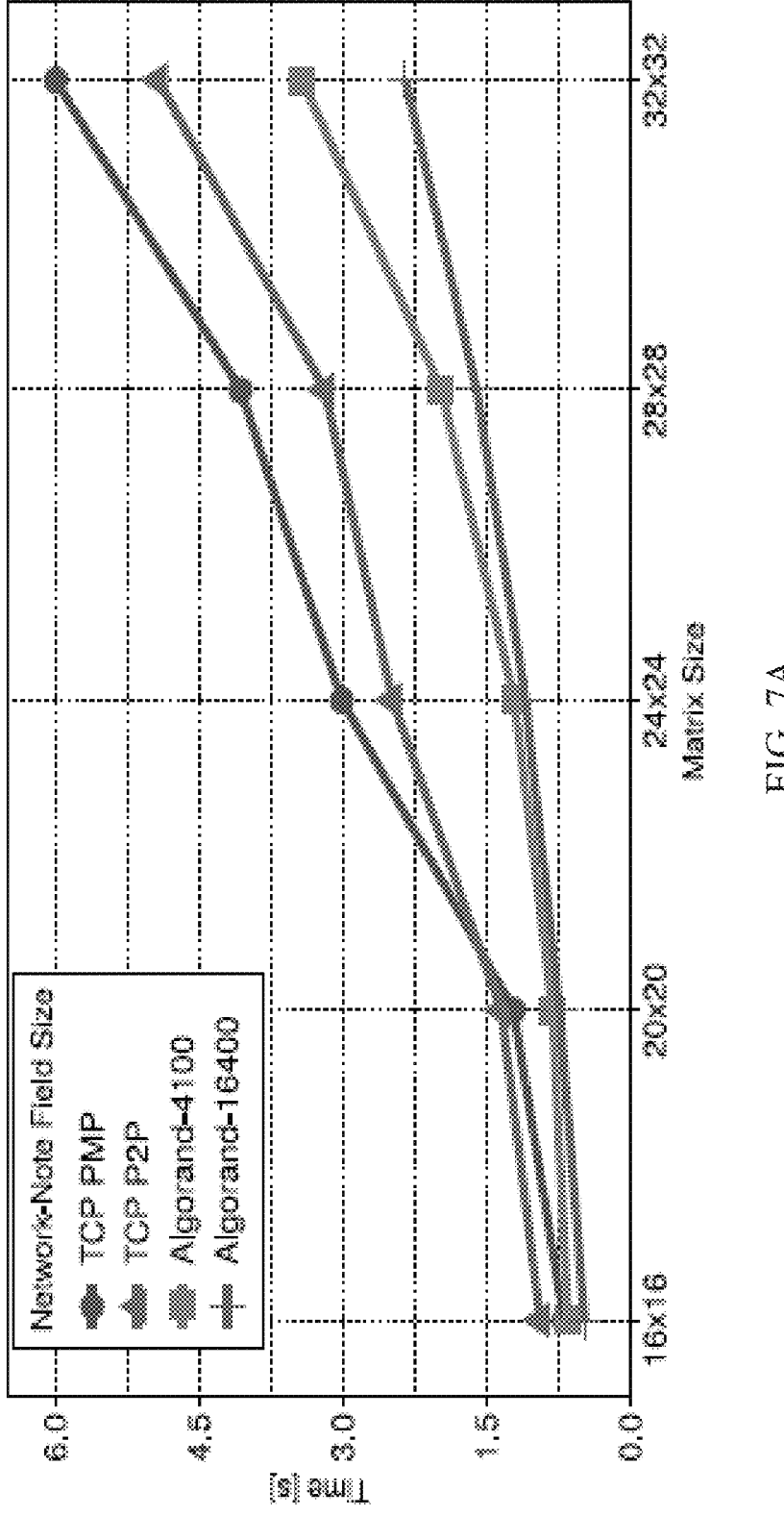
FIGS. 7A and 7B show plots of matrix size versus time (in ms), showing a comparison of MPC time using various network setups and different Algorand transaction payload size.
Figure 7B:
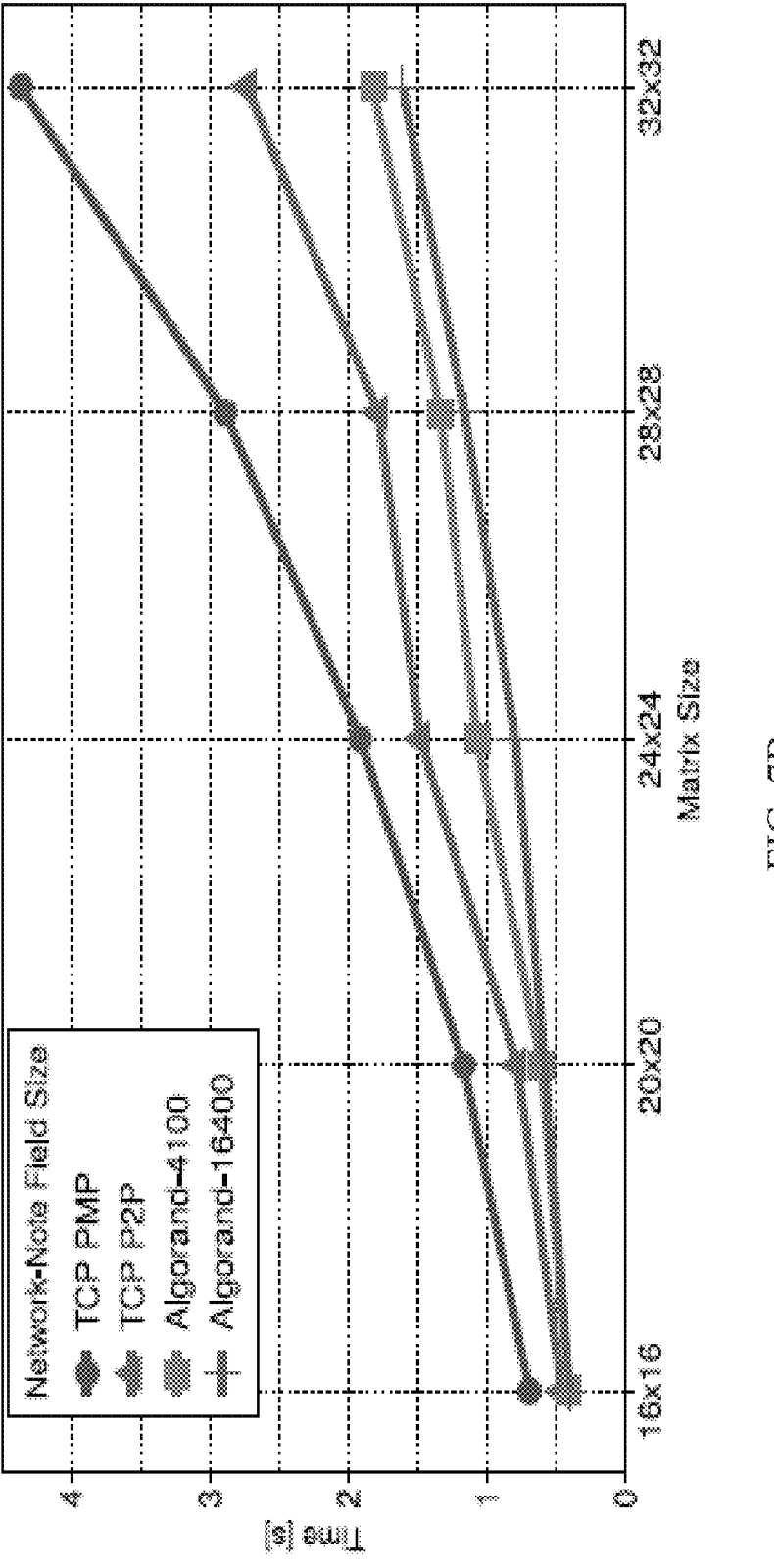

As shown in FIGS. 7A and 7B, the results indicate that the delay performance using the Algorand Broadcast outperforms the use of conventional P2P channels for both note field sizes. The average delay improvements across all matrices' sizes are 24% and 32% for note sizes 4 KB and 16 KB, respectively. Further, it was observed that the effect of increasing the note size limit is more notable for larger matrices, which is a good indicator of the suitability of the approach of embodiments of the subject invention for applications that require computing on large amounts of data.

Embodiments of the subject invention provide the first integration of MPC over the private Algorand Blockchain, leveraging its fast and secure broadcast channels to improve the overall MPC efficiency by reducing network communication complexity. The novel MPC system suits any general MPC protocol that relies on broadcast communication. The approach was evaluated by implementing secure matrix multiplications across multiple CSPs and integrating the SPDZ protocol with the private Algorand blockchain. The results show that the approach reduces the MPC execution delay compared to conventional MPC networks. Further, this blockchain-based network provides additional benefits that can improve MPC robustness, such as implementing mechanisms for failure recovery.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for secure multiparty computation (MPC), the system comprising:
a processor; and
a machine-readable medium in operable communication with the processor and having instructions stored thereon that, when executed by the processor, perform the following steps:
receiving first data from a first MPC node and second data from a second MPC node;
processing the first data and the second data into processed data;
packing the processed data into at least one Algorand blockchain transaction; and
utilizing an Algorand protocol to transmit the at least one Algorand blockchain transaction to the first MPC node and the second MPC node,
the Algorand protocol being run on a private Algorand network,
the private Algorand network comprising a plurality of MPC nodes and a plurality of relay nodes, the plurality of MPC nodes comprising the first MPC node and the second MPC node,
each MPC node of the plurality of MPC nodes connecting to at least one relay node of the plurality of relay nodes, and
the MPC nodes being offline nodes that do not participate in an Algorand consensus protocol but do send and receive transactions.

2. The system according to claim 1, each Algorand blockchain transaction of the at least one Algorand blockchain transaction being an Algorand payment transaction.

3. The system according to claim 1, the Algorand protocol utilized for transmitting the at least one Algorand blockchain transaction being a fast gossip protocol.

4. The system according to claim 1, the instructions when executed further performing the following steps:
recording the at least one Algorand blockchain transaction in an Algorand blockchain ledger.

5. The system according to claim 1, the transmitting of the at least one Algorand blockchain being done securely using Algorand secure broadcast channels.

6. The system according to claim 1, the instructions when executed by the processor further performing the following steps:
assigning a first peer a first Algorand account comprising a first public key and a first private key; and
assigning a second peer a second Algorand account comprising a second public key and a second private key,
the first peer being aware of the second public key, and the second peer being aware of the first public key.

7. The system according to claim 1, the packing of the processed data into the at least one Algorand blockchain transaction comprising appending the processed data to a respective note field of each Algorand blockchain transaction of the at least one Algorand blockchain transaction.

8. The system according to claim 7, the respective note field of each Algorand blockchain transaction of the at least one Algorand blockchain transaction having a size capacity of at least 1 kilobyte (kb).

9. A method for secure multiparty computation (MPC), the method comprising:
receiving first data from a first MPC node and second data from a second MPC node;
processing the first data and the second data into processed data;
packing the processed data into at least one Algorand blockchain transaction; and
utilizing an Algorand protocol to transmit the at least one Algorand blockchain transaction to the first MPC node and the second MPC node,
the Algorand protocol being run on a private Algorand network,
the private Algorand network comprising a plurality of MPC nodes and a plurality of relay nodes, the plurality of MPC nodes comprising the first MPC node and the second MPC node,
each MPC node of the plurality of MPC nodes connecting to at least one relay node of the plurality of relay nodes, and
the MPC nodes being offline nodes that do not participate in an Algorand consensus protocol but do send and receive transactions.

10. The method according to claim 9, each Algorand blockchain transaction of the at least one Algorand blockchain transaction being an Algorand payment transaction.

11. The method according to claim 9, the Algorand protocol utilized for transmitting the at least one Algorand blockchain transaction being a fast gossip protocol.

12. The method according to claim 9, further comprising:
recording the at least one Algorand blockchain transaction in an Algorand blockchain ledger.

13. The method according to claim 9, the transmitting of the at least one Algorand blockchain being done securely using Algorand secure broadcast channels.

14. The method according to claim 9, further comprising:
assigning a first peer a first Algorand account comprising a first public key and a first private key; and
assigning a second peer a second Algorand account comprising a second public key and a second private key,
the first peer being aware of the second public key, and the second peer being aware of the first public key.

15. The method according to claim 9, the packing of the processed data into the at least one Algorand blockchain transaction comprising appending the processed data to a respective note field of each Algorand blockchain transaction of the at least one Algorand blockchain transaction.

16. A system for secure multiparty computation (MPC), the system comprising:
a processor; and
a machine-readable medium in operable communication with the processor and having instructions stored thereon that, when executed by the processor, perform the following steps:
receiving first data from a first MPC node and second data from a second MPC node;
assigning a first peer a first Algorand account comprising a first public key and a first private key;
assigning a second peer a second Algorand account comprising a second public key and a second private key;
processing the first data and the second data into processed data;
packing the processed data into a first Algorand blockchain transaction and a second Algorand blockchain transaction;
recording the first Algorand blockchain transaction in an Algorand blockchain ledger;

recording the second Algorand blockchain transaction in the Algorand blockchain ledger; and utilizing an Algorand protocol to transmit both the first Algorand blockchain transaction and the second Algorand blockchain transaction to the first MPC node and the second MPC node, the first Algorand blockchain transaction being an Algorand payment transaction, the second Algorand blockchain transaction being an Algorand payment transaction, the Algorand protocol utilized for transmitting the first and second Algorand blockchain transactions being a fast gossip protocol, the transmitting of the first Algorand blockchain and the second Algorand blockchain transaction being done securely using Algorand secure broadcast channels, the first peer being aware of the second public key, and the second peer being aware of the first public key, the Algorand protocol being run on a private Algorand network, the private Algorand network comprising a plurality of MPC nodes and a plurality of relay nodes, the plurality of MPC nodes comprising the first MPC node and the second MPC node, each MPC node of the plurality of MPC nodes connecting to at least one relay node of the plurality of relay nodes, the MPC nodes being offline nodes that do not participate in an Algorand consensus protocol but do send and receive transactions, the packing of the processed data into the first Algorand blockchain transaction comprising appending the processed data to a note field of the first Algorand blockchain transaction, and the note field of the first Algorand blockchain transaction having a size capacity of at least 1 kilobyte (kb).

* * * * *